United States Patent
Wang (10) Patent No.: US 12,301,410 B2
(45) Date of Patent: May 13, 2025

(54) ELECTRONIC DEVICE, METHOD FOR ELECTRONIC DEVICE, COMPUTER READABLE MEDIUM, AND APPARATUS

(71) Applicant: ARRIS Enterprises LLC, Suwanee, GA (US)

(72) Inventor: Xin Wang, Shenzhen-Gu (CN)

(73) Assignee: ARRIS Enterprises LLC, Horsham, PA (US)

( * ) Notice: Subject to any disclaimer, the term of this patent is extended or adjusted under 35 U.S.C. 154(b) by 73 days.

(21) Appl. No.: 17/234,281

(22) Filed: Apr. 19, 2021

(65) Prior Publication Data

US 2022/0045901 A1 Feb. 10, 2022

(30) Foreign Application Priority Data

Aug. 7, 2020 (CN) .......................... 202010788811.8

(51) Int. Cl.
*H04L 41/0803* (2022.01)
*H04L 41/0866* (2022.01)
*H04L 41/28* (2022.01)

(52) U.S. Cl.
CPC ...... *H04L 41/0803* (2013.01); *H04L 41/0866* (2013.01); *H04L 41/28* (2013.01)

(58) Field of Classification Search
CPC . H04L 41/0803; H04L 41/0866; H04L 41/28; H04L 63/083; H04L 63/101;
(Continued)

(56) References Cited

U.S. PATENT DOCUMENTS 7,292,588 B2 * 11/2007 Milley .................... H04L 67/04
370/401
10,523,716 B1 * 12/2019 Stickle .................... H04L 41/28
(Continued)

FOREIGN PATENT DOCUMENTS

CN 106412896 A 2/2017
CN 107404720 A 11/2017
(Continued)

OTHER PUBLICATIONS

Notification of the First Office Action, issued on Jan. 27, 2025, in corresponding Chinese Application No. 202010788881.8, including English-language translation, 20 pages.

*Primary Examiner* — Alex H. Tran
(74) *Attorney, Agent, or Firm* — Panitch Schwarze Belisario & Nadel LLC (57) ABSTRACT

The present disclosure relates to an electronic device, a method for an electronic device, a computer readable medium, and an apparatus. An electronic device, comprises: a memory having instructions stored thereon; and a processor configured to execute the instructions stored on the memory, to cause the electronic device to perform at least the following: receiving a network configuration information processing request from a first user device for a network to which the first user device is connected; determining whether one or more user devices have been set as primary devices, the primary devices having authorities to process network configuration information; in response to determining that the one or more user devices have been set as primary devices: determining whether the first user device is one of the primary devices; in response to determining that the first user device is one of the primary devices, responding to the network configuration information processing request; and in response to determining that the first user device is not one of the primary devices, denying the
(Continued)

network configuration information processing request; and in response to determining that no user device is set as a primary device: responding to the network configuration information processing request.

14 Claims, 4 Drawing Sheets

(58) Field of Classification Search
CPC . H04L 63/08; H04L 63/0823; H04L 41/0806; H04L 41/0813; H04L 41/0823; H04L 41/084; H04L 41/0895; H04L 41/0886; H04W 12/06; H04W 12/08; H04W 84/20; G06F 21/31
See application file for complete search history.

(56) References Cited

U.S. PATENT DOCUMENTS

| | | | | |
|---|---|---|---|---|
| 10,915,334 B2* | 2/2021 | Krum | | G06F 9/4451 |
| 11,323,854 B2* | 5/2022 | Li | | H04L 43/0817 |
| 2008/0155126 A1* | 6/2008 | Swain | | H04L 41/0886 |
| | | | | 709/251 |
| 2010/0114826 A1* | 5/2010 | Voutilainen | | H04L 67/1095 |
| | | | | 707/638 |
| 2013/0238768 A1* | 9/2013 | Vaidya | | H04L 67/14 |
| | | | | 709/220 |
| 2013/0297757 A1* | 11/2013 | Han | | H04L 45/58 |
| | | | | 709/222 |
| 2017/0187703 A1 | 6/2017 | Enrique Salpico | | |
| 2017/0284818 A1* | 10/2017 | Boss | | H04W 4/08 |
| 2018/0034693 A1* | 2/2018 | Li | | H04L 67/52 |
| 2018/0331895 A1* | 11/2018 | Tang | | H04L 67/1097 |
| 2021/0160134 A1* | 5/2021 | Anquet | | G06F 15/177 |
| 2022/0330263 A1* | 10/2022 | Petersen | | H04W 72/543 |

FOREIGN PATENT DOCUMENTS

| | | | | |
|---|---|---|---|---|
| CN | 110113181 A | * | 8/2019 | |
| CN | 107333322 B | | 6/2020 | |
| FR | 3103586 A1 | * | 5/2021 | ......... G06F 15/7807 |
| JP | 2021051532 A | * | 4/2021 | ......... G06F 11/0709 |
| KR | 20140119857 A | * | 10/2014 | ........... H04W 56/00 |
| WO | WO-2010048048 A2 | * | 4/2010 | ......... G06F 11/1425 |

* cited by examiner

ELECTRONIC DEVICE, METHOD FOR ELECTRONIC DEVICE, COMPUTER READABLE MEDIUM, AND APPARATUS

TECHNICAL FIELD

The present disclosure relates to the field of electronic devices, and more particularly, to electronic devices associated with network access devices capable of providing network connections to a plurality of user devices.

BACKGROUND

Network access devices, such as routers, while providing network connections to the user devices, further provide the functions of configuring and managing the network connections. To facilitate use of the network, currently users are often allowed to remotely access and set various network configuration information maintained by the routers by using user devices connected to the routers. This presents a certain risk in terms of security. Although it is usually required to provide an account and a password when logging in a configuration interface of a router, once the account and the password are leaked, an unauthorized user will be able to change an access password or a configuration information access password of a network, to restore a router to factory settings, or to modify parental control policies of the router, without permission.

SUMMARY

To solve at least some of the aforementioned deficiencies of the current network access devices in use, the present disclosure provides an electronic device, a method for an electronic device, a computer readable medium, and an apparatus capable of further improving the security of network configuration information maintained by the network access device.

According to one aspect of the present disclosure, there is provided an electronic device. The electronic device may comprise a memory having instructions stored thereon; and a processor configured to execute the instructions stored on the memory, to cause the electronic device to perform at least the following: receiving a network configuration information processing request from a first user device for a network to which the first user device is connected; determining whether one or more user devices have been set as primary devices, the primary devices having authorities to process network configuration information; in response to determining that the one or more user devices have been set as primary devices: determining whether the first user device is one of the primary devices; in response to determining that the first user device is one of the primary devices, responding to the network configuration information processing request; and in response to determining that the first user device is not one of the primary devices, denying the network configuration information processing request; and in response to determining that no user device is set as a primary device: responding to the network configuration information processing request.

In some embodiments, the processor is further configured to execute the instructions stored on the memory to cause the electronic device to perform at least the following: determining whether a primary device setting request from a second user device is received; in response to determining that no user device is set as the primary device and determining that the primary device setting request is not received: responding to the network configuration information processing request; and in response to determining that no user device is set as the primary device and determining that the primary device setting request is received: processing the primary device setting request preferentially over the network configuration information processing request.

In some embodiments, the processor is further configured to execute the instructions stored on the memory to cause the electronic device to perform at least the following: receiving a primary device setting request from a second user device; in response to determining that the one or more user devices have been set as the primary devices: determining whether the second user device is one of the primary devices; in response to determining that the second user device is one of the primary devices, responding to the primary device setting request; and in response to determining that the second user device is not one of the primary devices, denying the primary device setting request.

In some embodiments, the processor is further configured to execute the instructions stored on the memory to cause the electronic device to perform at least the following: in response to determining that no user device has been set yet as the primary device: determining whether the second user device has an authority to set the primary device; in response to determining that the second user device has the authority to set the primary device, responding to the primary device setting request; and in response to determining that the second user device has no authority to set the primary device, denying the primary device setting request.

In some embodiments, the processor is further configured to execute the instructions stored on the memory to cause the electronic device to perform at least the following: in response to determining that no user device has been set yet as the primary device: responding to the primary device setting request.

In some embodiments, the processor is further configured to execute the instructions stored on the memory to cause the electronic device to perform at least the following: adding one or more user devices indicated in the primary device setting request as additional primary device(s); or revoking one or more user devices indicated in the primary device setting request which have acted as the primary devices; or replacing existing primary devices with one or more user devices indicated in the primary device setting request.

In some embodiments, the processor is further configured to execute the instructions stored on the memory to cause the electronic device to perform at least the following: in a case where a plurality of user devices are set as the primary devices, setting respective priorities for the plurality of user devices.

In some embodiments, the processor is further configured to execute the instructions stored on the memory to cause the electronic device to perform at least the following: permitting overwriting of a request to modify the network configuration information from a user device with a lower priority, with a request to modify the network configuration information from a user device with a higher priority, among the plurality of user devices.

In some embodiments, the network configuration information processing request includes a request for at least one of the following: accessing the network configuration information; modifying the network configuration information; and restoring the network configuration information to a default value.

According to another aspect of the present disclosure, there is provided a method for an electronic device. The method may comprise operations performed by the aforementioned electronic device according to the embodiments of the present disclosure.

According to yet another aspect of the present disclosure, there is provided a non-transitory computer readable medium, the non-transitory computer readable medium having instructions stored thereon, when executed by a processor of an electronic device, to cause the electronic device to perform the aforementioned method according to the embodiments of the present disclosure.

According to yet another aspect of the present disclosure, there is provided an apparatus, comprising means for performing the aforementioned method for the electronic device according to the embodiments of the present disclosure.

BRIEF DESCRIPTION OF THE DRAWINGS

To better understand the present disclosure and to show how to implement the present disclosure, a description will be given, by way of example and with reference to the accompanying drawings, in which.

Note that like reference numerals refer to corresponding parts throughout the drawings.

DETAILED DESCRIPTION

The following detailed description is made with reference to the accompanying drawings and is provided to assist in a comprehensive understanding of various exemplary embodiments of the disclosure. The following description includes various details to aid understanding, but these details are to be regarded as examples only and are not intended to limit the disclosure, which is defined by the appended claims and their equivalents. The words and phrases used in the following description are intended only to provide a clear and consistent understanding of the disclosure. In addition, descriptions of well-known structures, functions, and configurations may be omitted for clarity and conciseness. Those of ordinary skill in the art will recognize that various changes and modifications of the examples described herein can be made without departing from the spirit and scope of the disclosure.

Figure 1:
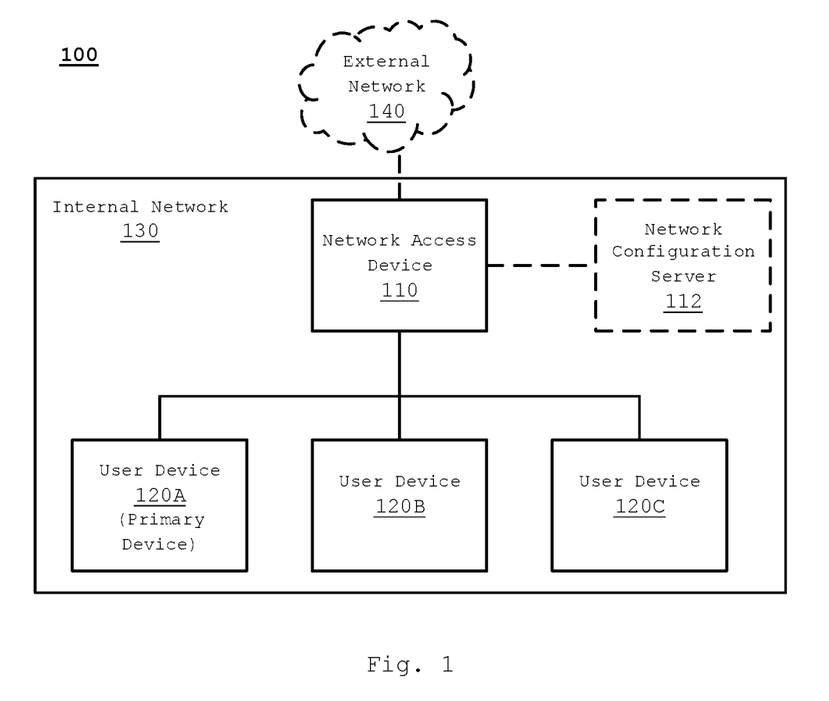
FIG. 1 shows a schematic diagram of an example network environment including a network access device in accordance with an embodiment of the present disclosure.

FIG. 1 is a schematic diagram illustrating an example network environment 100 in accordance with an embodiment of the present disclosure.

The example network environment 100 may include a network access device 110 and one or more user devices 120A, 120B, 120C (hereinafter collectively referred to as user devices 120 for simplicity). The network access device 110 is used to provide network connections to the user devices 120. Specifically, the network access device 110 may receive/route various types of communications from the user device 120 and/or transmit/route various types of communications to the user device 120. In some embodiments, the network access device 110 provides only an internal network 130 (e.g., a wired or wireless Local Area Network (LAN)) connection for the user devices 120. All of the user devices 120 connected to the network access device 110 are within the same internal network and in direct communication with each other. In a further embodiment, the network access device 110 is also connected to an external network 140, whereby the user device 120 may access the external network 140. The network access device 110 may be, for example, a hardware electronic device that combines the functions of a Network Access Server (NAS), a router, a Layer 2/Layer 3 switch, an access point, and the like. The network access device 110 may also include, but is not limited to, the function of an IP/QAM Set Top Box (STB) or Smart Media Device (SMD) capable of decoding audio/video content and playing contents provided by Over-The-Top (OTT) media service or Multiple System Operator (MSO).

In some embodiments, the user device 120 may be any electronic device having at least one network interface. For example, the user device 120 may be a desktop computer, a laptop computer, a server, a mainframe computer, a cloud-based computer, a tablet computer, a smartphone, a smartwatch, a wearable device, a consumer electronic device, a portable computing device, a radio node, a router, a switch, a repeater, an access point, and/or other electronic devices. As will be introduced in more detail below in conjunction with FIG. 2, the user device 120 utilizes its network interface to communicate with a physical or virtual network interface of the network access device 110 so as to access the internal network 130 via the network access device 110. A plurality of user devices 120A, 120B, 120C may be connected to the same or different network interfaces of the network access device 110. Although three user devices are shown in FIG. 1, it should be understood that the number of user devices to which the network access device can connect may be less than or more than three, depending on the number of specific physical interfaces and/or the network capacity supported by the network access device.

The external network 140 may include various types of wired or wireless networks, internal networks, or public networks, such as other Local Area Networks (LANs) or Wide Area Networks (WANs) (e.g., the Internet). Note that the present disclosure is not particularly limited as to the type of the external network 140.

In some embodiments, the network environment 100 may further include a network configuration server 112. The network configuration server 112 may maintain network configuration information associated with the internal network 130 provided by the network access device 110 to the user device 120. For example, as a non-limiting example, the network configuration server 112 may store an access password and a configuration information access password for the internal network 130. In the specific example where the network access device 110 is a router that provides a parental control function, the network configuration server 112 may also store parental control policy information, such as information associated with access-restricted devices, access-restricted times, or access-restricted websites. The network configuration server 112 may also provide an interface for processing network configuration information to a user. For example, a user may access the network configuration server 112 via the user device 120 and access or modify the network configuration information via an interface provided by the network configuration server 112, or reset the network configuration information by restoring the network access device 110 to factory settings.

In some embodiments, the network configuration server 112 may be external to the network access device 110 and communicatively coupled to the network access device 110 so as to facilitate exchange of data and control signaling. In some other embodiments, the network configuration server 112 may be integrated within the network access device 110.

Figure 2:
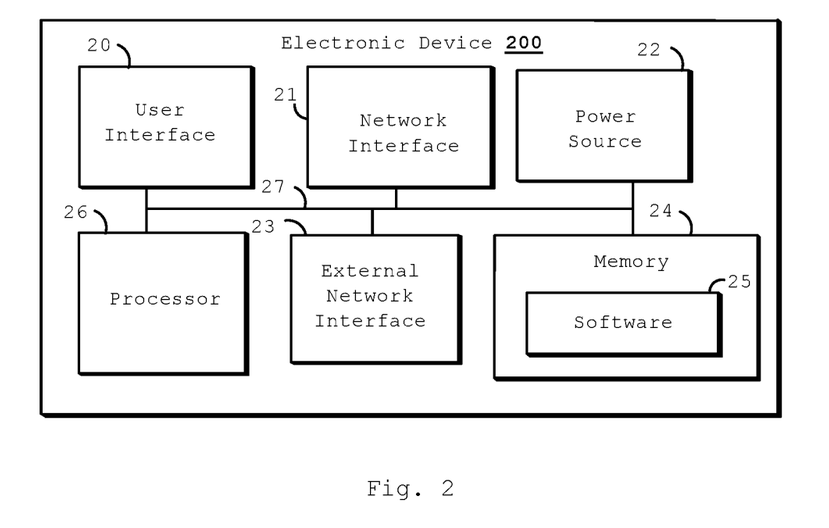
FIG. 2 illustrates a block diagram of an electronic device for implementing a network access device in accordance with an embodiment of the disclosure.

FIG. 2 illustrates an exemplary configuration block diagram of an electronic device 200 in accordance with an embodiment of the disclosure. The electronic device 200 may be used for implementing the network interface device 110 in FIG. 1.

As shown in FIG. 2, the electronic device 200 comprises a user interface 20, a network interface 21, a power supply 22, an external network interface 23, a memory 24, and a processor 26. The user interface 20 may include, but is not limited to, buttons, a keyboard, a keypad, an LCD, a CRT, TFT, LED, HD, or other similar display devices, including display devices having touch screen capabilities to enable interaction between a user and the electronic device. In some embodiments, the user interface 20 may be used to present a Graphical User Interface (GUI) to receive a user input.

The network interface 21 may include various network cards and circuitries implemented in software and/or hardware to enable communication with user devices using wired or wireless protocols. The wired communication protocol is, for example, any one or more of the Ethernet protocol, Multimedia over Coax Alliance (MoCA) specification protocol, USB protocol, or other wired communication protocol. The wireless protocol is, for example, any IEEE 802.11 Wi-Fi protocol, Bluetooth protocol, Bluetooth Low Energy (BLE), or other short range protocols operating in accordance with wireless technology standards for exchanging data over short distances using any licensed or unlicensed frequency band (such as the citizen broadband radio service (CBRS) band, the 2.4 GHz band, the 5 GHz band, the 6 GHz band, or the 60 GHz band) such as the RF4CE protocol, the ZigBee protocol, the Z-Wave protocol, or the IEEE 802.15.4 protocol. In a case where the network interface 21 uses a wireless protocol, in some embodiments, the network interface 21 may also include one or more antennas (not shown) or circuit nodes for coupling to one or more antennas. The electronic device 200 may provide an internal network (e.g., the internal network 130 of FIG. 1) to the user device via the network interface 21.

The power supply 22 provides power to the internal components of the electronic device 200 via an internal bus 27. The power source 22 may be a self-contained power source, such as a battery pack, whose interface is powered by a charger connected to an outlet (e.g., directly or through other device). The power source 22 may also include a rechargeable battery that is removable for replacement, such as a NiCd, NiMH, Li-ion or Li-pol battery. The external network interface 23 may include various network cards and circuitries implemented in software executed on hardware and/or hardware to enable communication between the electronic device 200 and a provider (e.g., an Internet service provider or a MSO) of an external network (e.g., the external network 140 of FIG. 1).

The memory 24 includes a single memory or one or more memories or memory positions including, but not limited to, Random Access Memory (RAM), Dynamic Random Access Memory (DRAM), Static Random Access Memory (SRAM), Read Only Memory (ROM), Erasable Programmable Read Only Memory (EPROM), Electrically Erasable Programmable Read Only Memory (EEPROM), flash memory, a logical block of an FPGA, a hard disk, or any other layer of a memory hierarchy. The memory 24 may be used to store any type of instructions, software, or algorithms, including software 25 for controlling general functions and operations of the electronic device 200.

The processor 26 controls the general operations of the electronic device 200 and performs management functions related to other devices in the network (such as user devices). The processor 26 may include, but is not limited to, a CPU, hardware microprocessor, hardware processor, multi-core processor, single-core processor, microcontroller, Application Specific Integrated Circuit (ASIC), DSP, or other similar processing device capable of executing any type of instructions, algorithms, or software for controlling the operations and functions of the electronic device 200 in accordance with embodiments described in the present disclosure. The processor 26 may be various implementations of digital circuitry, analog circuitry, or mixed signal (a combination of analog and digital signals) circuitry that perform functions in a computing system. The processor 26 may include, for example, a system such as an Integrated Circuit (IC), a portion or circuitry of an individual processor core, an entire processor core, an individual processor, a programmable hardware device such as a Field Programmable Gate Array (FPGA), and/or a system including a plurality of processors.

The internal bus 27 may be used to establish communications between the components (e.g., 20-22, 24, and 26) of the electronic device 200.

Although the electronic device 200 is described using specific components, in alternative embodiments, different components may be present in the electronic device 200. For example, the electronic device 200 may include one or more additional processors, memories, network interfaces, external network interfaces, and/or user interfaces. Additionally, one or more of the components may not be present in the electronic device 200. Further, in some embodiments, the electronic device 200 may include one or more components not shown in FIG. 2. Additionally, although separate components are shown in FIG. 2, in some embodiments, some or all of given components may be integrated into one or more of the other components in the electronic device 200. Furthermore, any combination of analog and/or digital circuits may be used to implement the circuits and components in the electronic device 200.

Figure 3:
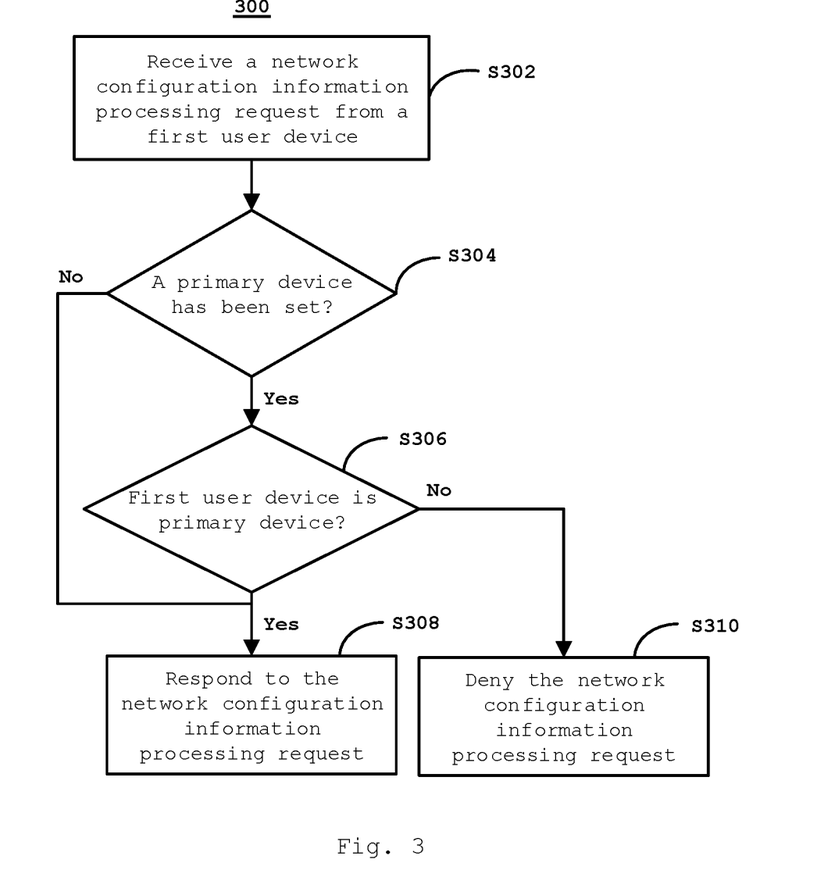
FIG. 3 shows an exemplary flow diagram of a method for an electronic device in accordance with an embodiment of the present disclosure.

FIG. 3 shows a flow diagram of a method 300 for an electronic device in accordance with an embodiment of the present disclosure. The method 300 may be used, for example, with the network access device 110 as shown in FIG. 1 or the electronic device 200 as shown in FIG. 2. An electronic device and a method for the electronic device in accordance with an embodiment of the present disclosure will be described in detail below with reference to FIGS. 1 to 3.

As shown in FIG. 3, in step S302, the processor 26 of the electronic device 200 receives a network configuration information processing request from a first user device for a network to which the first user device is connected.

As previously described, the electronic device 200 may provide a network (e.g., the internal network 130 of FIG. 1) to the first user device via the network interface 21, and accordingly receive the network configuration information processing request from the first user device. The first user device may be, for example, the user device 120 in FIG. 1, where "first" is merely to facilitate description and distinction and not intended to emphasize an order.

In some embodiments, the first user device may issue the network configuration information processing request by accessing a network configuration server (e.g., a network configuration server 112 in FIG. 1) via a network. Access to the network configuration server may pass through the electronic device 200 whether the network configuration server is internal or external to the electronic device 200. For example, the first user device may access a network configuration server (e.g., a network configuration server 112 in FIG. 1) to issue a network configuration information processing request in any way of a Web-based Graphical User Interface (GUI), an application program (APP), a Simple Network Management Protocol (SNMP), or a user terminal device wide area network management protocol (TR 069). In one specific example where the electronic device 200 is a router, for example, a user of the first user device may enter "192.168.0.1" in its browser to access a router configuration webpage provided by the network configuration server after the first user device being connected to the router, and the router may receive the access request.

In some embodiments, the network configuration information processing request may include a request for at least one of: accessing network configuration information, modifying the network configuration information, and restoring the network configuration information to a default value. The network configuration information may be any configuration information associated with an internal network or external network connection provided by the electronic device 200 to the user device. As a non-limiting example, the network configuration information may include a network access password, an access password for the network configuration information, or setting information for other network functions (e.g., parental control, port forwarding, Demilitarized Zone (DMZ)). Restoring the network configuration information to the default value may include restoring the electronic device 200 to factory settings.

In some embodiments, the processor 26 may authenticate a user using the first user device before or at the same time as step S302. For example, the user may be required to provide an account and/or password via the first user device, the account and/or password is matched against a reference account and/or password, and the user is successfully authenticated as a legitimate user when the provided account and/or password and the reference account and/or password matches. The processor 26 may perform step S302 or further perform step S304 only after the authentication succeeds.

In step S304, the processor 26 determines whether one or more user devices have been set as primary devices, wherein the primary devices may have authorities to process the network configuration information.

Later with a reference to FIG. 5 how a user device is set as a primary device and whether a user device can be set as a primary device will described in details. Generally, a primary device may be set by default upon initialization of the internal network, or can be set by a primary device setting request. The primary device setting request may indicate a user device that initiates the request, and a user device that is to be set as a primary device. In some embodiments, the initiating user device is checked for if it is a primary device or for other authority to set the primary device. In some further embodiments, the qualification of the user device to be set as the primary device is also checked. It means that in a strict situation, a user device can only be set as a primary device if it is set by an authorized user device and it has qualification as a primary device itself.

Figure 5:
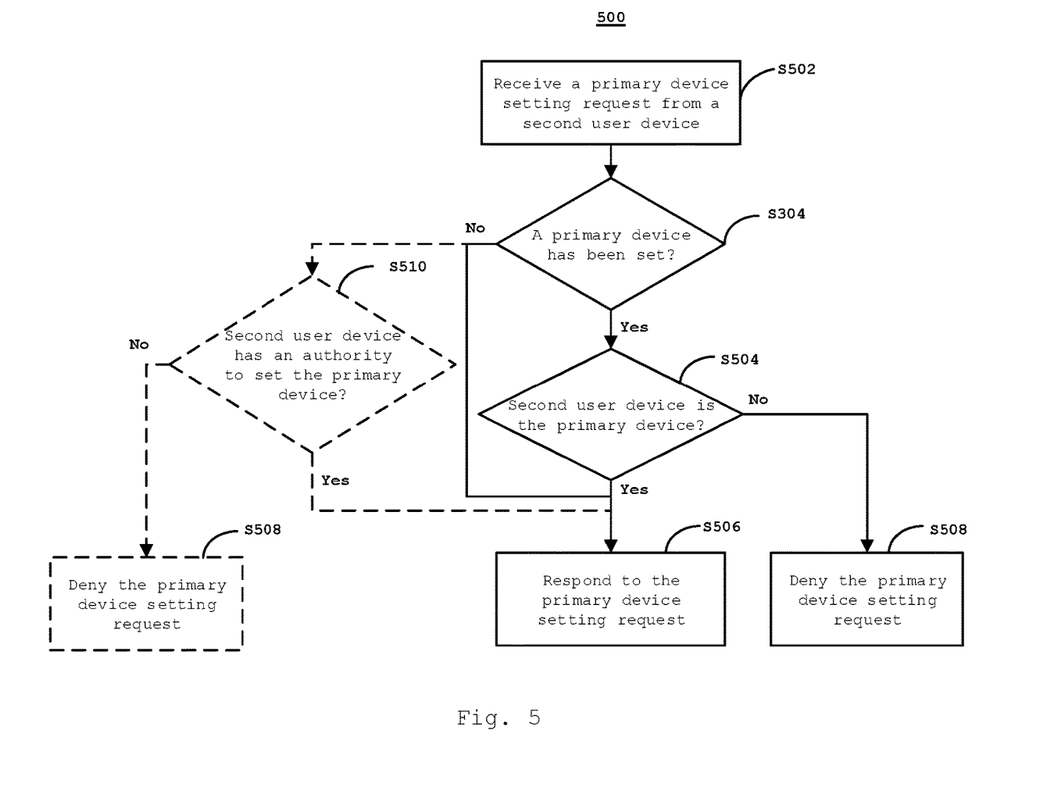
FIG. 5 shows an exemplary flow diagram of a method for an electronic device to process a primary device setting request in accordance with another embodiment of the present disclosure.

But it should be recognized that this kind of double checking is not always necessary, sometimes a single check may be sufficient, as illustrated in FIG. 5.

In some embodiments, step S304 includes first confirming, by the processor 26, whether a primary device mode is enabled. The user can enable/disable the primary device mode in any way of the Web-based GUI, APP, SNMP, or TR 069. If the mode is enabled, then whether the primary devices have been set can be determined. Otherwise, if the mode is disabled, the process goes directly to step S308.

In some embodiments, information, such as user device unique identifiers, for one or more user devices to be used as primary devices may be stored in a memory 24 of the electronic device 200 or in an associated network configuration server. In some other embodiments, the processor 26 may mark the one or more user devices as primary devices in response to a user's selection of the one or more user devices in the list of user devices which have been connected to the electronic device 200, and record their respective unique identifiers. The unique identifier of a user device may be, for example, a Media Access Control (MAC) address of the user device.

In some embodiments, the processing that the primary device has the authority to perform on the network configuration information may include those processes requested in the aforementioned network configuration information processing request, which is not described herein again.

In response to determining in step S304 that the one or more user devices have been set as primary devices, in step S306 the processor 26 further determines whether the first user device is one of the primary devices.

In some embodiments, the network configuration information processing request from the first user device comprises a unique identifier of the first user device. The processor 26 can compare the unique identifier of the first user device with the unique identifiers of the one or more user devices acting as primary devices stored in the memory 24 of the electronic device 200 or the associated network configuration server to determine whether the first user device is a primary device.

In response to determining in step S306 that the first user device is one of the primary devices, in step S308, the processor 26 may respond to the network configuration information processing request received in step S302. In some embodiments, responding to the network configuration information processing request may include performing the requested processing of the network configuration information. In further embodiments, the processor 26 may accordingly perform, in accordance with the network configuration information processing request, at least one of the following: sending the network configuration information to the first user device, modifying the network configuration information and restoring the network configuration information to a default value.

In response to determining in step S306 that the first user device is not one of the primary devices, in step S310, the processor 26 may deny the network configuration information processing request. In some embodiments, denying the network configuration information processing request may include denying performance of the requested processing on the network configuration information. In further embodiments, the processor 26 may accordingly deny, in accordance with the network configuration information processing request, performance of at least one of the following: sending the network configuration information to the first user device, modifying the network configuration information and restoring the network configuration information to a default value.

In some embodiments, in a case where a plurality of user devices are set as primary devices, the processor 26 may also set respective priorities for the plurality of user devices. In a case where there is a conflict in the network configuration information processing requests from a plurality of primary devices, the network configuration information processing request from a primary device with a higher priority is preferentially guaranteed to be performed. For example, the processor 26 may be configured to permit overwriting of a request to modify network configuration information from a user device with a lower priority, with a request to modify network configuration information from a primary device with a higher priority, and to deny overwriting of a request to modify network configuration information from a primary device with a higher priority, with a request to modify network configuration information from a user device with a lower priority. To accomplish this, the processor 26 may store, in an internal memory of the electronic device 200 or a network configuration server, a processing log of network configuration information, including an unique identifier and priority information of a primary device requesting the processing. In this way, upon receiving a request from a primary device to process network configuration information, the processor 26 may determine whether the priority of the primary device is not lower than that of another primary device that previously performed processing on the same network configuration information, and if not lower, perform the network configuration information processing request (step S308), and if lower, deny the network configuration information processing request (step S310).

It should be understood that while an order of performing the steps is shown in FIG. 3, in other embodiments in accordance with the present disclosure, any other order of performing (including simultaneously) may be employed. For example, step S302 may be performed after step S304, i.e., on a path of which the determination result of step S304 is "yes" and/or on a path of which the determination result of step S304 is "no". For another example, step S304 and step S306 may be performed at the same time.

The method 300 in accordance with the embodiment of the present disclosure enables the electronic device to distinguish the user devices, and allows only the authorized user devices to process the network configuration information, thereby improving the security of the network configuration information. In addition, the method 300 also allows any user device to process the network configuration information without arranging any primary device, thereby realizing the compatibility with the traditional network control mode.

Next, an exemplary flow diagram of a method 400 for an electronic device in accordance with another embodiment of the present disclosure is described with reference to FIG. 4. The method 400 may be used, for example, for the network access device 110 shown in FIG. 1 or for the electronic device 200 shown in FIG. 2. In the method 400, steps S302, S304 to S310 are the same as the method 300 described with reference to FIG. 3, so the same reference numerals are attached and the description is omitted. Hereinafter, only the steps S402 and S404 different from the method 300 in FIG. 3 will be described.

Figure 4:
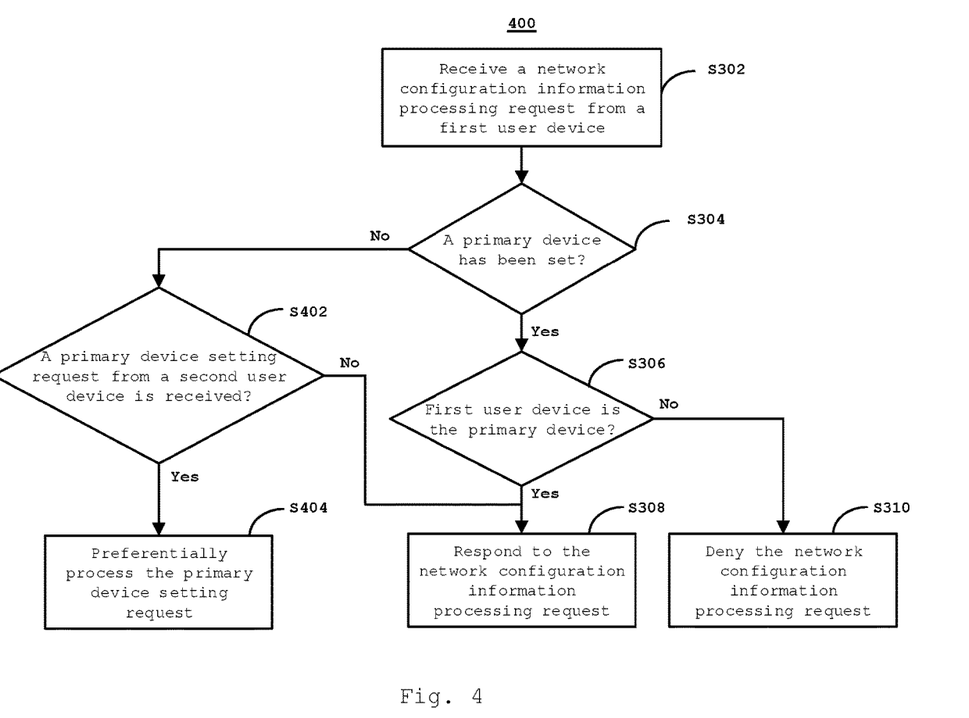
FIG. 4 shows an exemplary flow diagram of a method for an electronic device in accordance with another embodiment of the present disclosure.

Unlike the step S308 performed when the determination result of the step S304 is "no" in FIG. 3, as shown in FIG. 4, in some embodiments, when the determination result of the step S304 is "no", it may be determined whether a primary device setting request from a second user device is received at step S402.

Like the first user device, the second user device may be any one of the user devices (e.g., the user device 120 in FIG. 1) connected to the electronic device 200. The "second" is only to facilitate description and distinction and not intended to emphasize an order. In some embodiments, the second user device may be a different user device that is connected to the electronic device 200 at the same time as the first user device. In some other embodiments, the second user device may be the same user device as the first user device.

In some embodiments, the primary device setting request may request adding one or more user device as primary devices. In some embodiments, the primary device setting request may request one or more user devices that have been set as primary devices to be revoked to non-primary devices. In some embodiments, the primary device setting request may request one or more of the user devices that have been set as primary devices to be replaced with another one or more user devices. The primary device setting request may include unique identifiers of one or more user devices that are to be set or revoked. The one or more user devices to which the primary device setting request is targeted may include or exclude the second user device.

In some embodiments, the second user device may issue a primary device setting request to the electronic device 200 by accessing a network configuration server (e.g., the network configuration server 112 in FIG. 1) via a network. For example, the second user device may issue the primary device setting request in any way of a Web-based GUI, APP, SNMP, or TR 069.

In response to receiving the primary device setting request from the second user device in step S402, the primary device setting request is preferentially processed in step S404.

"Preferentially processed" means prioritizing the primary device setting request over the network configuration information processing request. In some embodiments, preferentially processing the primary device setting request may include suspending a processing of the network configuration information processing request. For example, step S304 may be performed after the processing of the primary device setting request is completed. In some other embodiments, the network configuration information processing request may be directly denied, that is, step S310 is performed.

The specific steps of processing the primary device setting request will be described later with reference to FIG. 5.

In some embodiments, the processor 26 may authenticate a user using the second user device before or at the same time as step S402. For example, the user may be required to provide an account and/or password via the second user device, the account and/or password is matched against a reference account and/or password, and the user is successfully authenticated as a legitimate user when the provided account and/or password and the reference account and/or password matches. The processor 26 may perform step S402 or further perform the subsequent step only after the authentication succeeds.

In some embodiments, in response to not receiving the primary device setting request from the second user device in step S402, the method 400 may proceed to step S308. The specific processing of this step may refer to the description of FIG. 3, and is not described herein again.

Although the order in which the steps are performed is shown in FIG. 4, in other embodiments in accordance with the present disclosure, any other order of performing the steps (including simultaneously) may be employed.

For example, steps S402 and S404 may be performed between steps S302 and S304. In this way, step S304 is performed when the determination result of step S402 is "no", and the manner of performing steps S304-S310 completely coincides with FIG. 3.

For another example, step S402 and step S404 may be performed after step S308. In this case, the second user device may be the same user device as the first user device. The user device may first request an access to network configuration information including a list of all user devices connected to the electronic device 200 at step S302. If no primary device is set at this time, the method 400 proceeds to step S308, whereby the user device can obtain the list of all the user devices connected to the electronic device 200. Then, the user device selectively sets one or more of the user devices connected to the electronic device 200 as primary devices, and transmits such primary device setting request to the electronic device 200. The electronic device 200 will process the primary device setting request in accordance with step S404.

The method 400 in accordance with embodiments of the present disclosure enables an electronic device to guarantee a primary device to be set preferentially, thereby preventing a user device from illegally processing network configuration information when a primary device has not been set yet.

Next, an exemplary flow diagram of a method 500 for processing a primary device setting request in accordance with an embodiment of the present disclosure is described with reference to FIG. 5. The method 500 may be used, for example, for the network access device 110 as shown in FIG. 1 or the electronic device 200 as shown in FIG. 2. The method 500 may be performed in conjunction with the method described with reference to FIG. 3 or the method 400 described with reference to FIG. 4, or may be performed separately. For example, the method 500 may be performed after step S404 of the method 400 (including step S404 after the order of performing the steps is adjusted for the method 400) as a specific procedure of processing the primary device setting request. In the method 500, step S304 is the same as the method 300 described with reference to FIG. 3 and the method 400 described with reference to FIG. 4, so the same reference numerals are attached and the description is omitted. Hereinafter, only differences from the method 300 in FIG. 3 and the method 400 in FIG. 4 will be described.

As shown in FIG. 5, in some embodiments, the processor 26 may receive a primary device setting request from a second user device in step S502. This step may be described with reference to part of the description associated with step S402 and step S404 in FIG. 4.

In some embodiments, in step S504, the processor 26 may determine whether the second user device is a primary device in response to determining that one or more user devices have been set as primary device(s). This step can refer to the description associated with step S306 in FIGS. 3 and 4, and a difference only lies in that the object targeted in step S306 is a first user device and the object targeted in step S504 is a second user device.

In some embodiments, in step S506, the processor 26 may respond to the primary device setting request in response to determining that the second user device is the primary device. In some embodiments, responding to the primary device setting request may include accordingly setting the primary device(s) in accordance with the primary device setting request. In further embodiments, the processor 26 may accordingly perform, in accordance with the primary device setting request, at least one of the following: adding one or more primary devices, revoking one or more primary devices, or replacing the existing one or more primary devices with one or more user devices. In other embodiments, responding to the primary device setting request may include checking at first if a user device indicated in the primary device setting request to be set as the primary device is qualified to be set as a primary device, and only accordingly setting the qualified user device as the primary device in accordance with the primary device setting request. For example, in a case where the electronic device 200 provides a parental control function, the user device to be set as the primary device may have been already listed as a device for which a portion or all of the network accesses are limited by the network configuration information being set. In such a case, if the user device is still allowed to be set as the primary device, it will have a chance to modify the parental control policy, which is undesirable. Therefore, it is preferable that such a user device is marked as being unqualified to be set as a primary device. In further embodiments, the processor 26 may store unique identifiers of user devices with or without qualifications to be set as a primary device in the memory 24 internal to the electronic device 200 or a network configuration server. Thus, the processor 26 may compare the identifier of the user device included in the primary device setting request to be set as a primary device with the stored unique identifiers of the user devices with or without the qualifications to be set as the primary device, so as to determine whether a user device is qualified to be set as a primary device.

In some embodiments, in step S506, the processor 26 may also determine whether there is a limit on the number of allowed primary devices, and in a case where there is a limit on the number of primary devices, make an appropriate adjustment to the response to the primary device setting request, or provide feedback information of the limit on the number of primary devices to the second user device. For example, if the number of allowed primary devices is limited to one and only one, then the processor 26 will only allow the second user device to hand over its own primary device identity to other user devices, without allowing the addition of a new primary device or sole revocation of its own primary device identity.

In some embodiments, in step S508, the processor 26 may deny the primary device setting request in response to determining that the second user device is not the primary device. In some embodiments, denying the primary device setting request may include denying performance of the requested primary device setting.

In some embodiments, upon determining in step S304 that the primary device is not set, the processor 26 may perform step S506, namely of processing the primary device setting request from the second user device.

In some other embodiments, upon determining in step S304 that the primary device is not set, the processor 26 may perform step S510, namely of further determining whether the second user device has an authority to set the primary device(s).

In some cases, the second user device is likely to have no authority to set the primary device(s). For example, in a case where the electronic device 200 provides a parental control function, the second user device may have been already listed as a device for which a portion or all of the network accesses are limited by the network configuration information being set. In such case, if the second user device is still allowed to set the primary device(s), it is likely to set itself as the primary device, thereby obtaining the authority to modify the parental control policy. Therefore, it is preferable that such a second user device will be marked as having no authority to set the primary device(s).

In some embodiments, the processor 26 may store unique identifiers of user devices with or without authorities to set the primary device(s) in the memory 24 internal to the electronic device 200 or a network configuration server. Thus, the processor 26 may compare the identifier of the second user device included in the primary device setting request with the stored unique identifiers of the user devices with or without the authorities to set the primary device(s), so as to determine whether the second user device has an authority to set the primary device(s).

In some embodiments, upon determining in step S510 that the second user device has the authority to set the primary device(s), the processor 26 may perform step S506, namely of processing the primary device setting request from the second user device.

In some embodiments, upon determining in step S510 that the second user device does not have the authority to set the primary device(s), the processor 26 may perform step S508, namely of denying the primary device setting request from the second user device.

Although the order in which the steps are performed is shown in FIG. 5, in other embodiments in accordance with the present disclosure, any other order of performing the steps (including simultaneously) may be employed.

The method 500 according to the embodiment of the present disclosure provides a security mechanism for setting the primary device, thereby enriching the applicability of the method 300 or the method 400 for guaranteeing the security of the network configuration information based on the primary device.

The present disclosure may be implemented as any combination of devices, systems, integrated circuits, and computer programs on non-transitory computer readable media. One or more controllers may be implemented as an Integrated Circuit (IC), an Application Specific Integrated Circuit (ASIC), or a large scale integrated circuit (LSI), a system LSI, a super LSI, or an ultra LSI package that performs some or all of the functions described in this disclosure.

The present disclosure includes the use of software, applications, computer programs, or algorithms. Software, applications, computer programs, or algorithms may be stored on a non-transitory computer readable medium to cause a computer, such as one or more processors, to perform the steps described above and depicted in the figures. For example, the one or more memories store software or algorithms in executable instructions and the one or more processors may associate a set of instructions to execute the software or algorithms to provide network configuration information management functionality for a network access device according to embodiments described in this disclosure.

Software and computer programs (which may also be referred to as programs, software applications, components, or code) include machine instructions for a programmable processor, and may be implemented in a high-level procedural, object-oriented, functional, logical, or assembly or machine language. The term "computer-readable medium" refers to any computer program product, apparatus or device, such as magnetic disks, optical disks, solid-state storage devices, memories, and Programmable Logic Devices (PLDs), used to provide machine instructions or data to a programmable data processor, including a computer-readable medium that receives machine instructions as a computer-readable signal.

By way of example, computer-readable media may comprise Dynamic Random Access Memory (DRAM), Random Access Memory (RAM), Read Only Memory (ROM), electrically erasable read only memory (EEPROM), compact disk read only memory (CD-ROM) or other optical disk storage, magnetic disk storage or other magnetic storage devices, or any other medium which may be used to carry or store desired computer-readable program code in the form of instructions or data structures and which may be accessed by a general-purpose or special-purpose computer or a general-purpose or special-purpose processor. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above are also included within the scope of computer-readable media.

Additionally, the above description provides examples, and does not limit the scope, applicability, or configuration set forth in the claims. Changes may be made in the function and arrangement of elements discussed without departing from the spirit and scope of the disclosure. Various embodiments may omit, substitute, or add various procedures or components as appropriate. For example, features described with respect to certain embodiments may be combined in other embodiments.

What is claimed is:

1. An electronic device, comprising:
a network interface configured to provide access to a network to which a first user device is connected;
at least one memory having instructions stored thereon and storing network configuration information associated with the network connection provided by the network interface of the electronic device; and
a processor configured to execute the instructions stored on the memory, to cause the electronic device to perform at least the following:
receiving a first network configuration information processing request from the first user device for the network, provided by the network interface of the electronic device, to which the first user device is connected, wherein said network configuration information processing request is a request for at least one of (i) accessing the network configuration information stored in the at least one memory of the electronic device, (ii) modifying the network configuration information stored in the at least one memory of the electronic device, and (iii) restoring the network configuration information stored in the at least one memory of the electronic device to a default value;
authenticating a user using the first user device concurrently with the receiving of the network configuration information processing request;
determining whether one or more user devices have been set as primary devices, the primary devices having authorities to process network configuration information and have authority to set and revoke user devices as primary devices;
in response to determining that a plurality of user devices have been set as primary devices:
determining that the first user device, from which the network configuration information processing request is received, is one of the primary devices;
overwriting a second network configuration information processing request to modify the network configuration information stored in the memory of the electronic device received from another user device having a priority that is lower than the priority of the first user device; and responding to the first network configuration information processing request by performing the requested processing of the network configuration information stored in the at least one memory of the electronic device.

2. The electronic device according to claim 1, wherein the processor is further configured to execute the instructions stored on the memory to cause the electronic device to perform at least the following:

determining whether a primary device setting request from a second user device is received.

3. The electronic device according to claim 1, wherein the processor is further configured to execute the instructions stored on the memory to cause the electronic device to perform at least the following:

receiving a primary device setting request from a second user device, wherein said primary device setting request identifies one or more user devices, excluding said second user device, that are to be set or revoked as the primary devices; and in response to determining that the plurality of user devices have been set as the primary devices:

determining whether the second user device is one of the primary devices;

in response to determining that the second user device is one of the primary devices, responding to the primary device setting request; and in response to determining that the second user device is not one of the primary devices, denying the primary device setting request.

4. The electronic device according to claim 3, wherein the processor is further configured to execute the instructions stored on the memory to cause the electronic device to perform at least the following:

determining whether the second user device has an authority to set the primary device;

in response to determining that the second user device has the authority to set the primary device, responding to the primary device setting request; and in response to determining that the second user device has no authority to set the primary device, denying the primary device setting request.

5. The electronic device according to claim 3, wherein the responding to the primary device setting request includes:

adding one or more user devices indicated in the primary device setting request as additional primary devices; or revoking one or more user devices indicated in the primary device setting request which have acted as the primary devices; or replacing existing primary devices with one or more user devices indicated in the primary device setting request.

6. A method for an electronic device, comprising:

providing, by a network interface of the electronic device, a network to which a first user device is connected;

storing, by at least one memory of the electronic device, network configuration information associated with the network connection provided by the network interface of the electronic device;

receiving, by a processor of the electronic device, a first network configuration information processing request from the first user device for the network, provided by the network interface, to which the first user device is connected, wherein said first network configuration information processing request is a request for at least one of (i) accessing the network configuration information stored in the at least one memory of the electronic device, (ii) modifying the network configuration information stored in the at least one memory of the electronic device, and (iii) restoring the network configuration information stored in the at least one memory of the electronic device to a default value;

authenticating, by the processor of the electronic device, a user using the first user device concurrently with the receiving of the network configuration information processing request;

determining, by the processor of the electronic device, whether one or more user devices have been set as primary devices, the primary devices having authorities to process network configuration information and have authority to set and revoke user devices as primary devices;

in response to determining that a plurality of user devices have been set as primary devices:

determining that the first user device, from which the network configuration information processing request is received, is one of the primary devices;

overwriting a second network configuration information processing request to modify the network configuration information stored in the memory of the electronic device received from a second user device having a priority that is lower than the priority of the first user device; and responding to the first network configuration information processing request by performing the requested processing of the network configuration information stored in the at least one memory of the electronic device.

7. The method according to claim 6, further comprising:

determining whether a primary device setting request from a second user device is received.

8. The method according to claim 6, further comprising:

receiving, by the processor of the electronic device, a primary device setting request from a second user device, wherein said primary device setting request identifies one or more user devices, excluding said second user device, that are to be set or revoked as the primary devices; and in response to determining that the plurality of user devices have been set as the primary devices:

determining whether the second user device is one of the primary devices;

in response to determining that the second user device is one of the primary devices, responding to the primary device setting request; and in response to determining that the second user device is not one of the primary devices, denying the primary device setting request.

9. The method according to claim 8, further comprising:

determining whether the second user device has an authority to set the primary device;

in response to determining that the second user device has the authority to set the primary device, responding to the primary device setting request; and in response to determining that the second user device has no authority to set the primary device, denying the primary device setting request.

10. The method according to claim 8, wherein the responding to the primary device setting request includes:

adding one or more user devices indicated in the primary device setting request as additional primary devices; or revoking one or more user devices indicated in the primary device setting request which have acted as the primary devices; or replacing existing primary devices with one or more user devices indicated in the primary device setting request.

11. A non-transitory computer readable medium, having instructions stored thereon, when executed by a processor of an electronic device, to cause the electronic device to perform at least the following:

provising a network to which a first user device is connected;

storing network configuration information associated with the network connection provided by the network interface of the electronic device;

receiving a first network configuration information processing request from the first user device for the network, provided by the electronic device, to which the first user device is connected, wherein said first network configuration information processing request is a request for at least one of (i) accessing the network configuration information stored in the at least one memory of the electronic device, (ii) modifying the network configuration information stored in the at least one memory of the electronic device, and (iii) restoring the network configuration information to a default value stored in the at least one memory of the electronic device;

authenticating a user using the first user device concurrently with the receiving of the network configuration information processing request;

determining whether one or more user devices have been set as primary devices, the primary devices having authorities to process network configuration information and have authority to set and revoke user devices as primary devices;

in response to determining that a plurality of user devices have been set as primary devices:

determining that the first user device, from which the network configuration information processing request is received, is one of the primary devices;

overwriting a second network configuration information processing request to modify the network configuration information stored in the memory of the electronic device received from a second user device having a priority that is lower than the priority of the first user device; and responding to the first network configuration information processing request by performing the requested processing of the network configuration information stored in the at least one memory of the electronic device.

12. The non-transitory computer readable medium according to claim 11, the non-transitory computer readable medium further having instructions stored thereon, when executed by the processor, to cause the electronic device to perform at least the following:

determining whether a primary device setting request from a second user device is received.

13. The non-transitory computer readable medium according to claim 11, the non-transitory computer readable medium further having instructions stored thereon, when executed by the processor, to cause the electronic device to perform at least the following:

receiving a primary device setting request from a second user device, wherein said primary device setting request identifies one or more user devices, excluding said second user device, that are to be set or revoked as the primary devices;

in response to determining that the plurality of user devices have been set as the primary devices:

determining whether the second user device is one of the primary devices;

in response to determining that the second user device is one of the primary devices, responding to the primary device setting request; and in response to determining that the second user device is not one of the primary devices, denying the primary device setting request.

14. The non-transitory computer readable medium according to 13, wherein the responding to the primary device setting request includes:

adding one or more user devices indicated in the primary device setting request as additional primary devices; or revoking one or more user devices indicated in the primary device setting request which have acted as the primary devices; or replacing existing primary devices with one or more user devices indicated in the primary device setting request.

* * * * *